United States Patent [19]

Miura et al.

[11] 4,451,518
[45] * May 29, 1984

[54] REINFORCING MEMBER

[75] Inventors: Toshikatu Miura; Hiroto Kikuchi; Yukio Okada; Tsutomu Yoshioka, all of Tokyo, Japan

[73] Assignee: Nissan Motor Company, Limited, Yokohama, Japan

[*] Notice: The portion of the term of this patent subsequent to Jan. 25, 2000 has been disclaimed.

[21] Appl. No.: 356,452

[22] Filed: Mar. 9, 1982

[30] Foreign Application Priority Data

Mar. 16, 1981 [JP] Japan .................................. 56-37576

[51] Int. Cl.³ ............................ B32B 5/20; B32B 3/10
[52] U.S. Cl. .................................... 428/137; 296/188; 296/189; 428/158; 428/174; 428/189; 428/304.4; 428/308.4; 428/319.3; 428/319.7
[58] Field of Search .......... 428/31, 113, 189, 158–160, 428/304.4, 308.4, 319.3, 174, 319.7, 137, 327; 293/126, 128; 296/188, 189

[56] References Cited

U.S. PATENT DOCUMENTS

| 3,873,407 | 3/1975 | Kumata et al. | 428/215 |
| 4,085,247 | 4/1978 | Godfried | 428/417 |
| 4,302,269 | 11/1981 | Steinberg et al. | 428/325 |

FOREIGN PATENT DOCUMENTS 2061196 5/1981 United Kingdom .

Primary Examiner—Paul J. Thibodeau
Attorney, Agent, or Firm—Lane, Aitken & Kananen

[57] ABSTRACT

A reinforcing member includes a reinforcing resin layer which is elastic in its semi-hardened or unhardened state before the reinforcing member is applied to an object to be reinforced and which is rigid in its hardened state; an expandable member centered along the reinforcing resin layer; the expandable member being narrower than the reinforcing resin layer; the expandable member being elastic at least before the reinforcing member is applied to the object; the expandable member being expandable to form a bead-like projection before the reinforcing resin layer hardens; the reinforcing resin layer having its edge portions extending beyond the expandable member, the underside of the edge portions thereof being adapted to adhere to the object.

7 Claims, 22 Drawing Figures

FIG.1
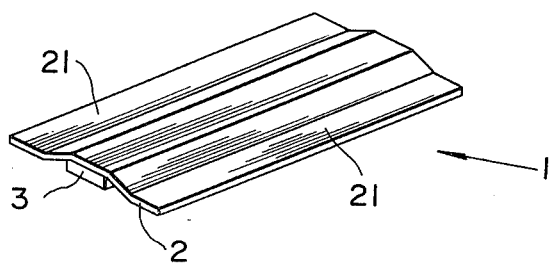
FIG.2(A)    FIG.2(B)
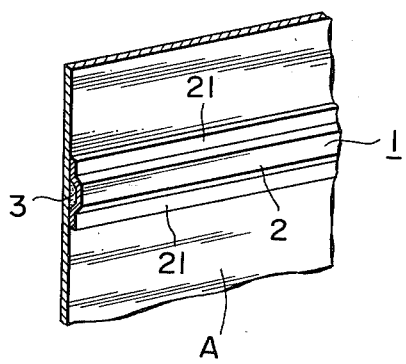 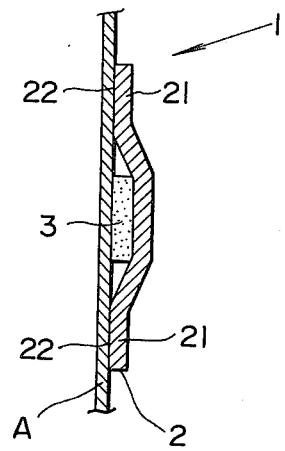
FIG.3(A)    FIG.3(B)
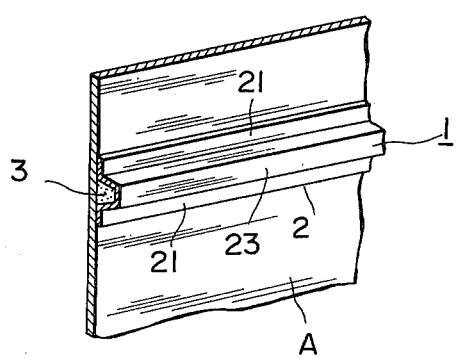 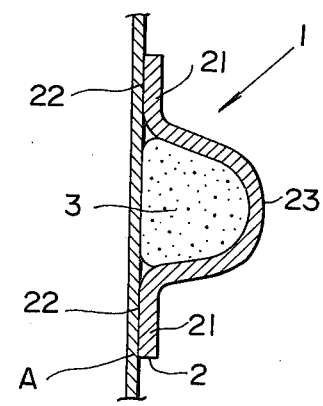

REINFORCING MEMBER

BACKGROUND OF THE INVENTION

This invention relates to a reinforcing member and a reinforced panel.

Weight reduction is desirable, for example, for automobiles, from the standpoint of resource-conservation and energy-conservation. If weight reduction is realized by reducing the thickness of the parts or reducing the number of components, the parts may come to have a reduced rigidity or strength. In the case of an automobile door, the panel strength can be significantly decreased at various portions, particularly in the outer panels. This results in poor door handling feeling.

For the above reason, it is necessary to develop a suitable reinforcing member. Reinforcement with a heavy metal sheet is contradictory to the purpose of weight reduction, and hence it has been proposed to reinforce the door outer panel entirely or partly with a light resin sheet.

However, prior art reinforcement with a resin sheet heretofore proposed comprises simply affixing a thin sheet of resin to the inside of the door outer panel. This alone is nearly useless for increasing the thickness and achieves a poor reinforcing effect. If the thickness is increased, the weight also will be increased. If packing is used between the resin sheet and the inner face of the door outer panel, the reinforcing member is apt to show poor shape-conforming ability, or to have a complicated structure, and therefore to be of little practical value.

SUMMARY OF THE INVENTION

In order to solve the above problems, this invention provides a reinforcing member which can easily conform to the shape of any part or parts to be reinforced, because it is in unhardened or semi-hardened state before use and is flexible, and which effectively reinforces the intended parts with relatively small amounts of the material, nevertheless with sufficient thickness, after its thermosetting, because it expands to form a projection and then hardens. This invention also provides a reinforced panel, the rigidity of which is markedly improved when the reinforcing member is effectively applied thereto.

BRIEF DESCRIPTION OF THE DRAWINGS

FIG. 1 is a perspective view showing a reinforcing member according to an embodiment of this invention;

FIG. 2(a) is a perspective view showing the reinforcing member shown in FIG. 1 as applied to a panel;

FIG. 2(b) shows a cross-section of the reinforcing member shown in FIG. 2(a) together with the panel;

FIG. 3(a) is a perspective view corresponding to FIG. 2(a) and showing the reinforcing member after expansion and hardening;

FIG. 3(b) is a cross-sectional view corresponding to FIG. 3(a);

DETAILED DESCRIPTION OF THE PREFERRED EMBODIMENTS

Figure 4A:
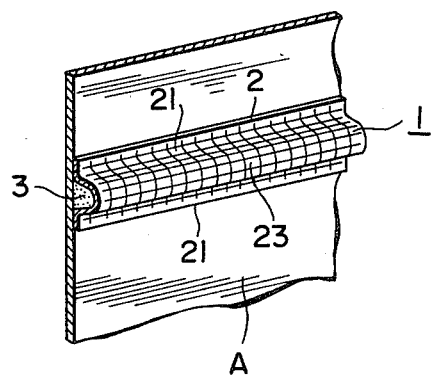
FIG. 4(a) is a perspective view showing a further reinforcing member according to this invention.

Hereinafter the present invention will be explained with reference to the preferred embodiments illustrated in the drawings, in which same references denote similar or corresponding parts.

FIGS. 1 through 3 show a first embodiment of the reinforcing member of this invention. In the state before use as illustrated in FIGS. 1 and 2, the reinforcing member 1 consists of a reinforcing resin layer 2 and a bead-forming member or expandable member 3 which is centered coaxially under the reinforcing resin layer 2 and is narrower than the layer 2. The undersides of the marginal portions 21 of the reinforcing resin layer 2 extend beyond the edges of the expandable member to serve as adhesive surfaces 22.

For the reinforcing resin layer 2, thermosetting resins, particularly epoxy resins, would be suitable materials, but melamine-, phenol-, and urea-type resins may also be used. The reinforcing resin layer 2 exhibits an unhardened or semi-hardened and flexible state before its thermosetting. The underside 22 of the marginal edge portions of the reinforcing member is made to be adhesive when the reinforcing member is to be used on vertical planes as shown in FIG. 2, so that the reinforcing member can stick to the part to be reinforced.

Either thermoplastic or thermosetting resin sheet is used in this embodiment for the expandable material 3, which expands upon heating, and is flexible before expanding, i.e., before the reinforcing member 1 is actually used.

The bead-forming material 3 may have a rectangular cross-section as obtained by cutting a sheet, or may have circular section or the like.

As illustrated in FIG. 2, the reinforcing member 1 is attached to the panel A by sticking the adhesive surface 22 to the panel A. Because the reinforcing resin layer 2 and the bead-forming material 3 at this stage still are flexible, they conform easily to the shape of the panel A. Particularly the expandable material 3 exhibits excellent conforming ability before expansion. Thus the adhesive surface 22 intimately adheres to the panel A without fail.

In the assembled state, the panel A and the reinforcing member 1 are heated, whereupon the viscosity of the reinforcing resin layer 2 decreases temporarily, further improving the intimacy of the adhesion. Concurrently the expandable material 3 swells to a cross-sectional size limited by the panel A, the resin layer 2, and the bonding points therebetween. The swelling stretches the resin layer 2 until a bead-like projection 23 is formed, and this shape is maintained until the resin layer 2 hardens.

As the heating is further continued over a prolonged period, the reinforcing resin layer 2 is hardened in a form conforming to the shapes of the panel A and the projection 23 and intimately adhered to the former to produce a reinforcing member 1 in the form illustrated in FIG. 3.

Obviously, the expandable material 3 need not be limited to the foam material which expands during heating, but may be other expandable materials or corrugated cardboard, rope, or the like. In short, any material which can form a bead-like projection 23 on the reinforcing resin layer 2 can be attached to under surface of the reinforcing resin layer 2 before it is applied to the panel A. The width should be narrower than that of said layer 2. Incidentally, foamable polyethylene sheet is one example of a suitable expandable sheet.

Figure 4B:
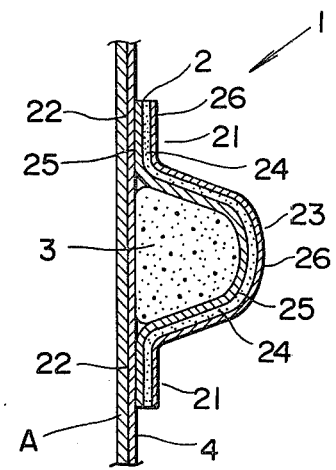
FIG. 4(b) shows a cross-section of the reinforcing member shown in FIG. 4(a)

FIG. 4 shows a second embodiment of the reinforcing member, in which the reinforcing resin layer 2 is composed of double layers, i.e., the upper resin layer 24 reinforced with glass fibers, and the soft resin layer 25 which expands during hardening and hardens with a predetermined resiliency. Furthermore, the surface of said layer 2 is coated with a film 26 of, for example, polyester. The under surface of the soft resin layer 25 serves as the adhesive surface 22. On the other hand, the panel A is covered with a rust-proofing coating 4. The expandable material 3 is identical with that used in the first embodiment.

The reinforced resin layer 24 in the reinforcing resin layer 2 is strengthened with fibers, which are used to improve the reinforcing effect. Besides the glass fiber, such organic and inorganic fibers as carbon fibers, metal cord, hemp, nylon and paper and the like may be used. The reinforcement can be effected by various means such as milling, embedding or adhering woven fabrics, non-woven fabrics, monofilaments and the like.

The soft resin layer 25 is used to prevent local strain or partial sagging of the panel A due to the expansion and shrinkage of the resin. If the soft resin layer is excessively elastic, the rigidity of the reinforcing member 1 will be lowered. The degree of expected local strain or sagging depends on the thickness of the panel A. Therefore the required elasticity should be predetermined and adjusted according to this value. Also the soft resin layer 25 may be used in conjunction with a hard resin layer not reinforced by fibers.

The film 26 is used to avoid, when the reinforcing resin layer 2 is adhesive, unintentional adhesion thereof and to facilitate its handling. The same effect can be achieved by powder.

The rust-proofing film 4 is applied to the panel A surface to prevent rust on the panel A, which often is a steel plate. Interfaces insufficiently coated with paint are particularly susceptible to rust. Zinc-treated film, coated film or the like may be used. The constituents added in the second embodiment can be selectively applied to the first embodiment.

In either of the first and second embodiments, the resin to be used in the reinforcing resin layer 2 may be not only those which harden at high temperatures but also those hardenable at room temperature or any thermoplastic resins having a high melting point and which are sufficiently strong at the temperatures under which the product is to be used. Also the expandable material to be used can be a room temperature-expandable sheet.

Hereinafter a reinforced panel which is effectively reinforced by the reinforcing member 1 will be explained with reference to FIGS. 5 and 6.

Figure 5:
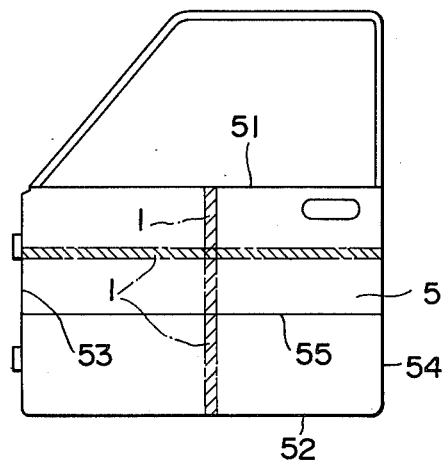
FIG. 5 is a pictorial view of an automobile door equipped with a reinforcing member according to this invention.

An automobile door is shown in FIG. 5, in which reference numeral 5 denotes the outer panel. Because the panel 5 is relatively flat, if its thickness is reduced to lighten its weight, its rigidity and tensile strength will be impaired, and the door will tend to deform easily or produce poor handling feelings. In the panel 5, the upper edge 51, lower edge 52, front edge 53 and rear edge 54 are supported by the inner plate and have high rigidity. The character line 55 also shows high rigidity because of its relative thickness. The parts having low rigidity to be reinforced are the upper portion and the peripheral portions thereof. Applying and hardening the reinforcing member to the upper portion alone, however, will be of little use, because means to distribute the load exerted on that portion would still be lacking.

In the embodiment shown in FIG. 5, the reinforcing member 1 extends between the upper edge 51 and the character line 55, which are of relatively high rigidity, and hardened to reinforce the central part of the low rigidity portion therebetween. In addition, the reinforcing member 1 extends to the lower edge 52 to reinforce the lower low-rigidity portion. Also, another reinforcing member 1 extends between the front edge 53 and the rear edge 54 along the horizontal center of the upper portion to reinforce the entirety of the upper low-rigidity area of the automobile door panel 5.

Figure 6:
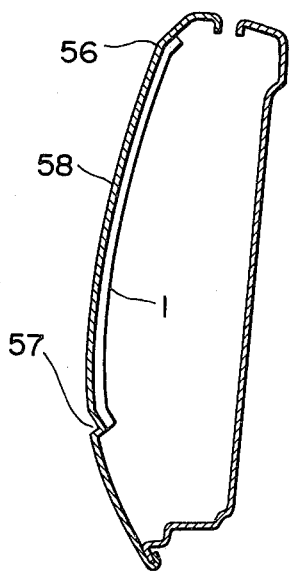
FIG. 6 is a cross-sectional view of another automobile door equipped with a reinforcing member according to this invention.

In the embodiment shown in FIG. 6, the reinforcing member 1 extends vertically between the upper character line 56 and the lower character line 57, and is hardened to reinforce the flat portion 58 therebetween.

When the reinforcing members 1 are disposed as in the illustrated embodiments, the loads on the low-rigidity portions are transmitted to the high-rigidity portions through the reinforcing members 1 and thereby absorbed. Thus a remarkable reinforcing effect can be achieved.

Incidentally, the shape of the reinforcing member 1 itself or the manner of arranging said reinforcing members need not be linear, but may be curved, lattice-like or in any other suitable pattern.

Figure 7:
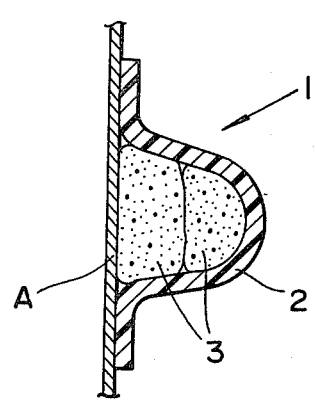
FIG. 7 shows a cross-section of another reinforcing member applied to a panel according to this invention.
Figure 8:
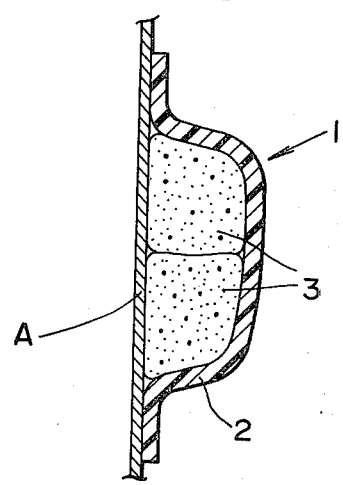
FIG. 8 shows a cross-section of still another reinforcing member applied to a panel according to this invention.

A third embodiment of the reinforcing member is shown in FIGS. 7 and 8, in which the dimensions of the bead-forming material are enlarged at specified places in order to effectively reinforce selected spots. In the embodiment shown in FIG. 7, plural layers of the expandable material are piled up to increase the height of the intended spot. In FIG. 8, the bead-forming members or expandable members are arranged side by side to increase the width of the intended spot. The expandable material 3 may be an integral mass, instead of the divided pieces, of which shape is given locally varied dimensions to achieve the same effects as described above.

In employing reinforcing members according to this third embodiment, like a beam of equal strength throughout, the portions supported by high-rigidity portions can be of small dimensions, and those supporting low-rigidity portions should be of larger dimensions. Thus, satisfactory reinforcement can be achieved with a minimal amount of reinforcing material.

Figure 9:
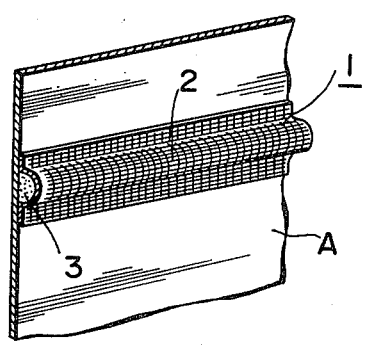
FIG. 9 is a perspective view of yet another reinforcing member attached to a panel according to this invention.

The fourth embodiment of this invention is shown in FIG. 9, in which the reinforcing resin layer 2 is reinforced with high tensile-strength fibers in the longitudinal direction and with low tensile-strength fibers in the transverse direction. Examples of the high tensile-strength fibers include stainless steel fiber, carbon fiber and glass fiber. Examples of the low tensile-strength fibers include cotton, nylon and polyester, or fiber glass depending on the type of the high tensile-strength fiber to be used concurrently.

In case the reinforcing member is to improve the bending strength predominantly, according to this embodiment, the minimum necessary degree of fiber reinforcement is provided in the transverse direction, to provide a cheap and light reinforcing member.

Figure 10:
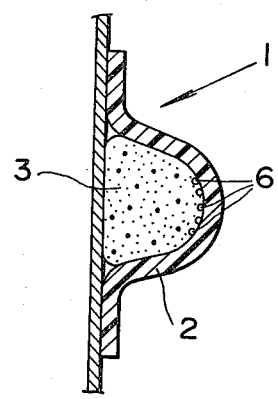
FIG. 10 is a cross-sectional view of yet another reinforcing member of this invention in which a bead-like projection is formed on a steel panel.

The fifth embodiment of the reinforcing member is shown in FIG. 10, in which the reinforcing fibers 6 are sandwiched between the reinforcing resin layer 2 and the expandable material 3.

The reinforcing fibers 2 improve the rigidity of the reinforcing member 1, by simultaneously reinforcing the resin layer 2 and bead-forming material 3, to provide a very effective reinforcing member in spite of its light weight.

Figure 11:
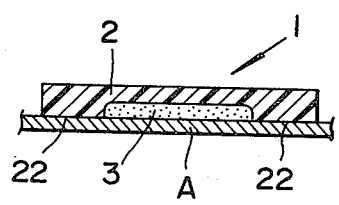
FIG. 11 shows a cross-section of another reinforcing member according to this invention.
Figure 12:
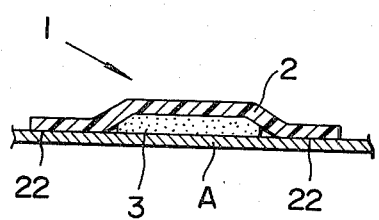
FIG. 12 shows a cross-section of another reinforcing member of this invention.

The sixth embodiment of a reinforcing member is shown in FIGS. 11 and 12. In this embodiment, a foamable material is used as the expandable material. If the expandable material is simply placed under the reinforcing resin layer 2, the former causes a protrusion on the outer surface, and may interfere with the contact or adhesion of the adhesive surface 22 to the panel to be reinforced. In order to eliminate this defect, in the embodiment shown in FIG. 11, the expandable material is recessed into the reinforcing resin layer 2. In the embodiment shown in FIG. 12, said layer 2 is curved in conformity to the shape of the expandable member 3 so that the adhesive surface 22 and the under surface of the bead-forming member or expandable member form a smooth surface. Consequently, when the reinforcing member 1 is applied to the panel to be reinforced, the adhesive surface 22 automatically contacts with the object to be reinforced, to effect intimate contact without gaps.

Figure 13:
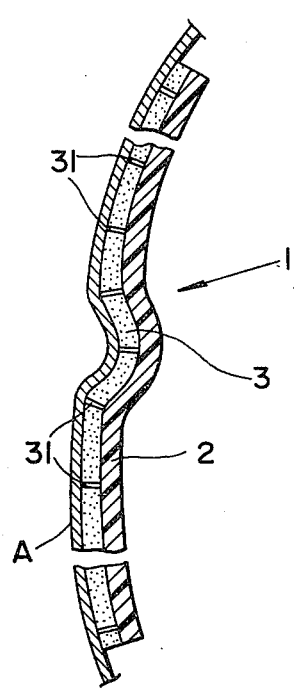
FIG. 13 shows a cross-section of another reinforcing member of this invention.
Figure 14:
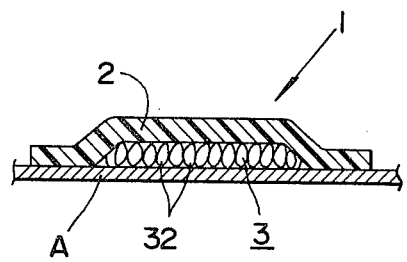
FIG. 14 shows a cross-section of another reinforcing member of this invention.

The seventh embodiment of the reinforcing member is shown in FIGS. 13 and 14. This embodiment is proposed to solve the problem of insufficient shape-conformability of the expandable member, which has some rigidity, even though it is flexible. Such a problem may arise depending on the shape of the member or parts to be reinforced.

In the embodiment illustrated in FIG. 13, many transverse slits 31 are formed at regular intervals in the longitudinal direction of the expandable member 3. Since the member 3 can easily bend at the slits 31, its shape-conformability is improved.

In the embodiment shown in FIG. 14, the expandable member is in the form of a large number of aggregate granules or particles 32, which provides greater flexibility and consequently improved shape-conformability. This embodiment is advantageous because, as the rigidity of the bead-forming member or expandable member 3 is reduced, the reinforming member 1 can more easily conform to the shape of the object to be reinforced. Also because the reinforcing member 1 can conform well to complicated curved surfaces of the object or to bent portions thereof with small diameters, the utility of the reinforcing member can be substantially broadened.

Figure 15:
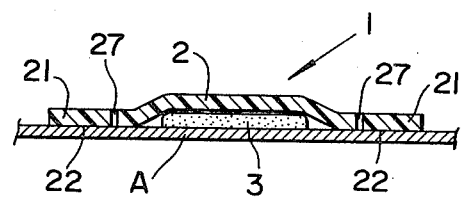
FIG. 15 shows a cross-section of another reinforcing member according to this invention.
Figure 16:
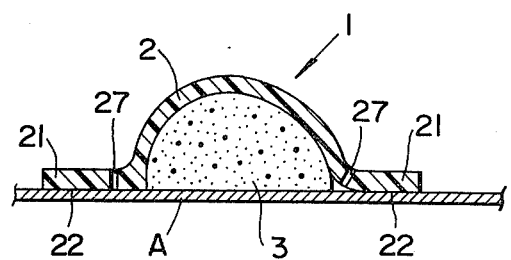
FIG. 16 is a cross-sectional view of another reinforcing member according to this invention.

The eighth embodiment of the reinforcing member is shown in FIGS. 15 and 16. A foamable material is used as the expandable member 3 in this embodiment.

Since the gas-filled cells of the expandable member expand to form the bead-like projection 23 after the reinforcing member 1 is applied to the object to be reinforced, the pressure of the foam gas may concentrate on the weakly-bonded spots between the adhesive surface 22 and the object to be reinforced. In such a case, the effectively bonded area of the adhesive surface 22 is reduced. Also the foam gas may leak from such spots to bring about a state of partial deflation. The integrity of the reinforcing member 1 and the object to be reinforced is impaired. As the result, reinforcement deteriorates.

The embodiment shown in FIGS. 15 and 16 is proposed to eliminate such a drawback. That is, as shown in FIG. 15, gas-outlet holes 27 are formed in the reinforcing resin layer 2, at positions close to the expandable member 3 on the marginal portions of the resin layer 2, before expansion of the expandable member. When the expandable member is heated to lift the reinforcing resin layer 2 to form a bead-like projection 23, if such a defectively-bonded portion exists, that portion will be lifted before the other, along with the associated marginal portions 21. As a result, the corresponding gas-inlet hole 27 opens to the expandable member 3 as shown in FIG. 16 to discharge therethrough the excess gas pressure. Consequently, puncture can be avoided, and a perfect adhesive surface 22 can be maintained.

Figure 18:
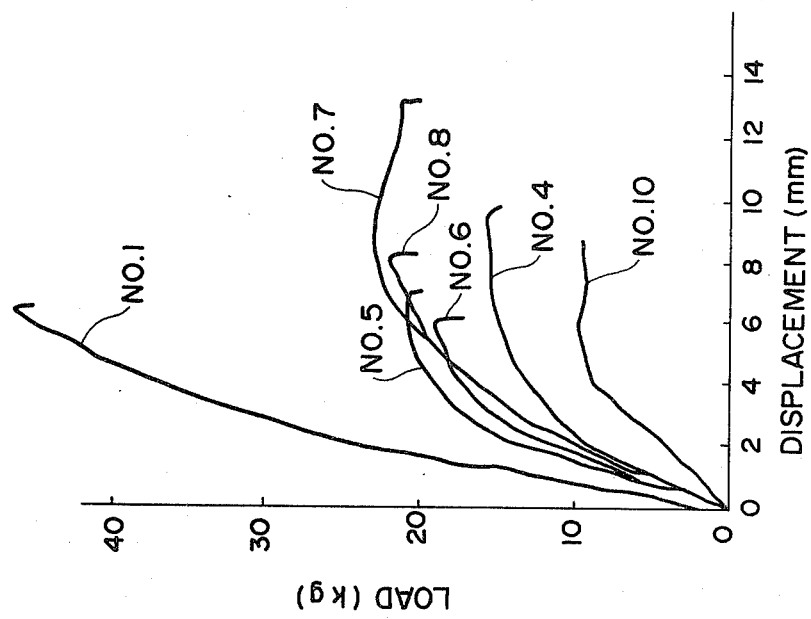
FIG. 18 is a graph of the load-displacement relationships of different reinforcing fibers in the reinforcement member.
Figure 17:
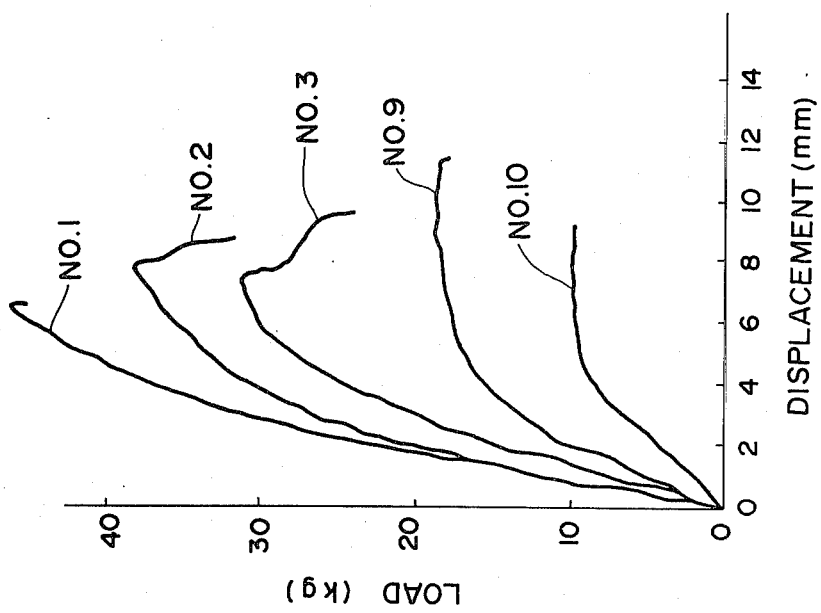
FIG. 17 is a graph of the load-displacement relationships of different thicknesses of the reinforcement member.

Suitable dimensions for the reinforcing member are examined in the ninth embodiment, and the test results thereof will be explained with reference to FIGS. 17 and 18.

When the outer panel of an automobile door is to be reinforced with a reinforcing member according to this invention, excessive reinforcement should be avoided. An excessively-thick reinforcing resin layer increases the weight of the reinforcing member, and the expansion or shrinkage of the resin will visibly affect the produce, by way of superficial local strain in the panel. Or, when the reinforcing member is applied to a vertical plane, it may become detached due to its own weight. Accordingly, better effect can be achieved by the use of appropriate reinforcing resin layer and reinforcing fibers.

In an experiment to determine the appropriate dimensions, a foamable polyethylene sheet as the expandable material is attached to the under surface of the reinforcing resin layer to form a reinforcing member, which is applied onto a 0.7 mm thick steel plate. The reinforcing member is hardened by heating, during which the sheet expands to form a 10 mm-high, bead-shaped projection. The above procedures are repeated while varying the thickness of the reinforcing resin layer, the type of fibers reinforcing the same, and size of said layer.

The products were subjected to a identical bending strength tests. The correlation of the thickness of the resin layer with rigidity revealed thereby is shown in FIG. 17. Also the correlation between the type of reinforcing fibers and rigidity is shown in FIG. 18.

| Sample No. | Thickness of reinforcing resin layer (mm) | Thickness of reinforcing fibers (mm) |
|---|---|---|
| No. 1 | 1.0 | 0.22 (glass cloth, plain weave) |
| No. 2 | 0.8 | 0.22 (glass cloth, plain weave) |
| No. 3 | 0.6 | 0.22 (glass cloth, plain weave) |
| No. 4 | 1.0 | (polypropylene non-woven fabric) |
| No. 5 | 1.0 | (polypropylene non-woven fabric) |
| No. 6 | 1.0 | (polyester non-woven fabric) |
| No. 7 | 1.0 | 0.5 (glass cloth) |
| No. 8 | 1.0 | 0.1 (glass cloth) |
| No. 9 | 1.0 | 0.22 (glass cloth) |
| No. 10 | (unreinforced, 0.7 mm-thick steel plate) | |

(Note: In Sample No. 9, butyl rubber 1.0 mm thick was bonded to the interface with the steel plate. The reinforcing resin layer was an epoxy sheet in all samples.)

According to the above test, reduction in the thickness of the reinforcing resin layer did not result in drastic decrease of the reinforcing effect. It was observed that as long as it is within the range of 0.5 mm–0.8 mm, the products can withstand a considerable load, as can be understood from the load-displacement curves of Sample Nos. 2 and 3 in FIG. 17. The proper thickness of the reinforcing fibers was determined for the case wherein the reinforcing resin layer was 1.0 mm thick. In this case, 0.22 mm-thick glass cloth was found to be appropriate. Thicker fibers tended to excessively infiltrate the epoxy resin, and the desired strength could not be obtained. On the other hand, thinner fibers provided insufficient strength as a reinforcing material. It was also found that organic non-woven fabric can withstand considerable load, as can be understood from the load-displacement curves shown in FIG. 18. It is clear that even if the reinforcing resin layer has a thickness of only 0.5–0.8 mm, organic non-woven fabric can be used as the reinforcing fibers.

Furthermore, although not shown as a graph, when 0.22 mm-thick glass cloth was used as the reinforcing fibers for a 0.6 mm-thick reinforcing resin layer on a 0.7 mm-thick steel plate in conjunction with a 13 mm-high bead-like projection, a bending strength ratio was equivalent to that in the case wherein the reinforcing resin layer has a thickness of 1.0 mm and the bead-like projection has a height of 10 mm. The reinforcing member also conformed well to the shape of the object to be reinforced.

In this embodiment, a reinforcing member has a light weight and can still achieve the appropriate reinforcing effect. The reinforcing member is free of detachment or superficial local strain.

A preferred method for applying the reinforcing member to the panels of automobiles will be described.

Figure 19:
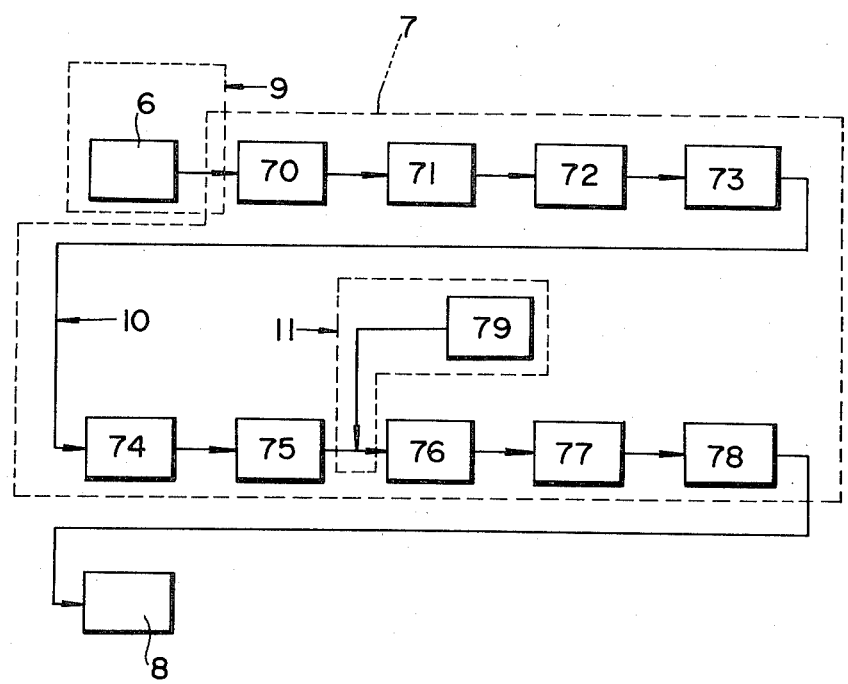
FIG. 19 is a functional block diagram of an automobile assembly line.

A partial manufacturing process of automobiles is illustrated in the block chart of FIG. 19, concerned mainly with the coating steps. In the chart, block 9 denotes a body-assembling step. For example, in case of doors, the pressing and assembling of door outer panels, door inner panels and other parts are performed in the body-assembling steps. In the coating step 7, the assembly-line includes a pre-treating step 70 to perform degreasing, cleaning and formation, etc., a drying step 71, an electrodeposition or first coating step 72, a baking step 73 to bake the first coating, second coating step 74, a baking step 75 to bake the second coating, the final coating step 76, a baking step 77 to bake the final coating and an inspection and touch-up step 78. Furthermore, block 79 is the masking step for sashes and side sills, etc., and block 8 is the trim chassis step. The second coating step 74 and the baking step 75 incidental thereto may be omitted in certain cases.

The reinforcing member can be applied in advance of the coating step 7 as indicated by the arrow R, and hardened by the drying heat employed in said step 7. In this case, the heat for the coating step can be utilized to thermoset the reinforcing member and to expand the expandable member to obviate an additional heating step. Furthermore the reinforcing member can be applied in the body-assembling line wherein individual articles and the parts in the sub-assembled state can be handled with relative freedom and ease. Therefore, the applying efficiency is high. Although degreasing of panels or the like is frequently insufficient in the body-assembling line, application of the reinforcing member involves no practical difficulty if the rust-proofing oil is wiped off of the panels or the like, for example, by some waste cloth.

In other embodiments, as indicated by the arrow S, a reinforcing member may be applied between the first coating step 72 and the second coating step 74, or, as indicated by the arrow T, before the final coating step 76, and hardened by the drying heat used in the subsequent steps of the coating procedure. When such a method is employed, the heat of the coating procedures can be utilized to eliminate the need for an additional heating step, similarly to the previous case. Furthermore, since the reinforcing member is applied over a coating, the product will be free from rust. It is also possible to apply the reinforcing member simultaneously with the masking or adhesion steps which are operations incidental to the coating procedure 7.

A reinforcing member according to the present invention is flexible before its attachment on an object to be reinforced and therefore conforms well to the shape of the object and can intimately adhere thereto. Therefore the reinforcing member need not be pre-shaped. Furthermore, after application and heat-treating, a bead-like projection of sufficient height is formed to provide high rigidity. The object to be reinforced can be quite satisfactorily reinforced. Thus the reinforcing member achieves a higher reinforcing effect per unit weight of reinforcing material than the prior art reinforcing means using flat plates, and contributes to weight reduction at little cost. For the heat-treating step, any conventional oven used in the coating procedure in the assembly-line production of automobiles can be utilized without modification. The reinforcing member may also be made into a product of high practical value via further treatments for rust-proofing, reinforcement with fibers, prevention of local strain, sagging or others.

According to the present invention, furthermore, low-rigidity portions of a panel can be supported by high-rigidity portions, using the reinforcing member or members, which have good shape-conforming ability and are easy to handle. Consequently good reinforcing effect can be achieved with a minimal amount of the reinforcing material, and a light-weight, highly-rigid reinforced panel can be achieved.

What is claimed is:

1. A reinforcing member including:
   a reinforcing resin layer, which is elastic in its semi-hardened or unhardened state before being applied to an object to be reinforced, and which is hardenable to a rigid state;
   an expandable member fixed along the reinforcing resin layer;
   the expandable member being narrower than the reinforcing resin layer;
   the expandable member being elastic at least before the reinforcing member is applied to the object;
   the expandable member being expandable to form a bead-like projection before the reinforcing resin layer hardens;
   the expandable member consisting of at least two divided pieces so as to selectively enlarge the dimensions thereof;
   the reinforcing resin layer having its edge portions extending beyond the expandable member, the underside of the edge portions thereof being adapted to adhere to the object;
   the reinforcing resin layer including fibers for reinforcing the resin layer.

2. A reinforcing panel wherein the object to be reinforced is a panel, and the reinforcing member set forth in claim 1 is placed to extend from an upper edge of the panel across a central portion thereof to support the central portion by way of the reinforcing member.

3. The reinforced panel of claim 2 wherein the panel is an outer panel of an automobile door.

4. A reinforcing member including:
   a reinforcing resin layer, which is elastic in its semi-hardened or unhardened state before being applied to an object to be reinforced, and which is hardenable to a rigid state;
   an expandable member fixed along the reinforcing resin layer;
   the expandable member being narrower than the reinforcing resin layer;
   the expandable member being elastic at least before the reinforcing member is applied to the object;
   the expandable member being expandable to form a bead-like projection before the reinforcing resin layer hardens;
   the reinforcing resin layer having its edge portions extending beyond the expandable member, the underside of the edge portions thereof being adapted to adhere to the object;
   the reinforcing resin layer including fibers for reinforcing the resin layer, wherein the fibers are reinforcing fibers sandwiched between the reinforcing resin layer and the expandable member.

5. A reinforcing member including:
   a reinforcing resin layer, which is elastic in its semi-hardened or unhardened state before being applied to an object to be reinforced, and which is hardenable to a rigid state;
   an expandable member made of a foamable material, and fixed along the reinforcing resin layer;
   the expandable member being narrower than the reinforcing resin layer;
   the expandable member being elastic at least before the reinforcing member is applied to the object;
   the expandable member being expandable to form a bead-like projection before the reinforcing resin layer hardens;
   the reinforcing resin layer having its edge portions extending beyond the expandable member, the underside of the edge portions thereof being adapted to adhere to the object, wherein a gas-venting hole is formed through the reinforcing resin layer;
   the reinforcing resin layer including fibers for reinforcing the resin layer.

6. A reinforcing member including:
   a reinforcing resin layer, which is elastic in its semi-hardened or unhardened state before being applied to an object to be reinforced, and which is hardenable to a rigid state;
   an expandable member fixed along the reinforcing resin layer;
   the expandable member being narrower than the reinforcing resin layer;
   the expandable member being elastic at least before the reinforcing member is applied to the object;
   the expandable member being expandable to form a bead-like projection before the reinforcing resin layer hardens;
   the reinforcing resin layer having its edge portion extending beyond the expandable member, the underside of the edge portions thereof being adapted to adhere to the object;
   the expandable member consisting of many aggregate particles or granules.

7. A reinforced object to which a reinforcing member is secured, said reinforced member including:
   a reinforcing resin layer, which is elastic in its semi-hardened or unhardened state before being applied to the object to be reinforced, and which is hardenable to a rigid state;
   an expandable member fixed along the reinforcing resin layer;
   the expandable member being narrower than the reinforcing resin layer;
   the expandable member being elastic at least before the reinforcing member is applied to the object;
   the expandable member being expandable to form a bead-like projection before the reinforcing resin layer hardens;
   the reinforcing resin layer having its edge portions extending beyond the expandable member, the underside of the edge portions thereof being adapted to adhere to the object;
   the reinforcing resin layer including fibers for reinforcing the resin layer; and
   a rust-proof coating provided between the reinforcing member and the object.

* * * * *